United States Patent [19]
Greenslate

[11] Patent Number: 5,911,392
[45] Date of Patent: Jun. 15, 1999

[54] RETAINER ASSEMBLY FOR PIPING ESCUTCHEONS OR WALL PLATES

[76] Inventor: Randal S. Greenslate, 1157 Arcadia, Encinitas, Calif. 92024

[21] Appl. No.: 08/728,958

[22] Filed: Oct. 11, 1996

[51] Int. Cl.⁶ .................................................. F16L 3/08
[52] U.S. Cl. ...................... 248/74.3; 248/56; 248/205.3
[58] Field of Search ................................ 248/49, 56, 65, 248/74.3, 205.3, 499, 500

[56] References Cited

U.S. PATENT DOCUMENTS

| | | | |
|---|---|---|---|
| 1,248,207 | 11/1917 | Tyner et al. ............................ | 248/56 X |
| 2,502,714 | 4/1950 | Garnett ................................. | 248/499 X |
| 3,284,037 | 11/1966 | Muller et al. ......................... | 248/74.3 X |
| 3,454,247 | 7/1969 | Geisinger .............................. | 248/56 |
| 3,632,069 | 1/1972 | Thayer et al. ........................ | 248/74.3 X |
| 4,005,882 | 2/1977 | Rickel et al. ......................... | 285/194 |
| 4,243,835 | 1/1981 | Ehrenfels ............................. | 285/194 X |
| 4,288,188 | 9/1981 | Smith .................................. | 248/499 X |
| 4,428,893 | 1/1984 | Cummings, Jr. et al. ............ | 248/74.3 X |
| 4,576,664 | 3/1986 | Delahunty ........................... | 248/499 X |
| 5,020,749 | 6/1991 | Kraus .................................. | 248/74.3 |
| 5,221,064 | 6/1993 | Hodges ............................... | 248/74.3 X |
| 5,368,261 | 11/1994 | Caveney et al. ..................... | 248/74.3 X |
| 5,388,791 | 2/1995 | McCrory et al. .................... | 248/74.3 X |
| 5,390,883 | 2/1995 | Songhurst ........................... | 248/74.3 |
| 5,632,457 | 5/1997 | Neely, Jr. ............................ | 248/74.3 X |

*Primary Examiner*—Daniel P. Stodola
*Assistant Examiner*—Richard M. Smith
*Attorney, Agent, or Firm*—Brown, Martin, Haller & McClain, LLP

[57] ABSTRACT

An elongate tether of flexible material has a first end with a fastener for securing the tether to an escutcheon member or canopy surrounding an opening in a building wall, ceiling or floor, and a second end for securing to a pipe extending through the opening. The second end of the tether has a slot through which a flexible tie member such as a cable tie extends. The tie member can be looped around a pipe to secure the tether to the pipe.

11 Claims, 2 Drawing Sheets

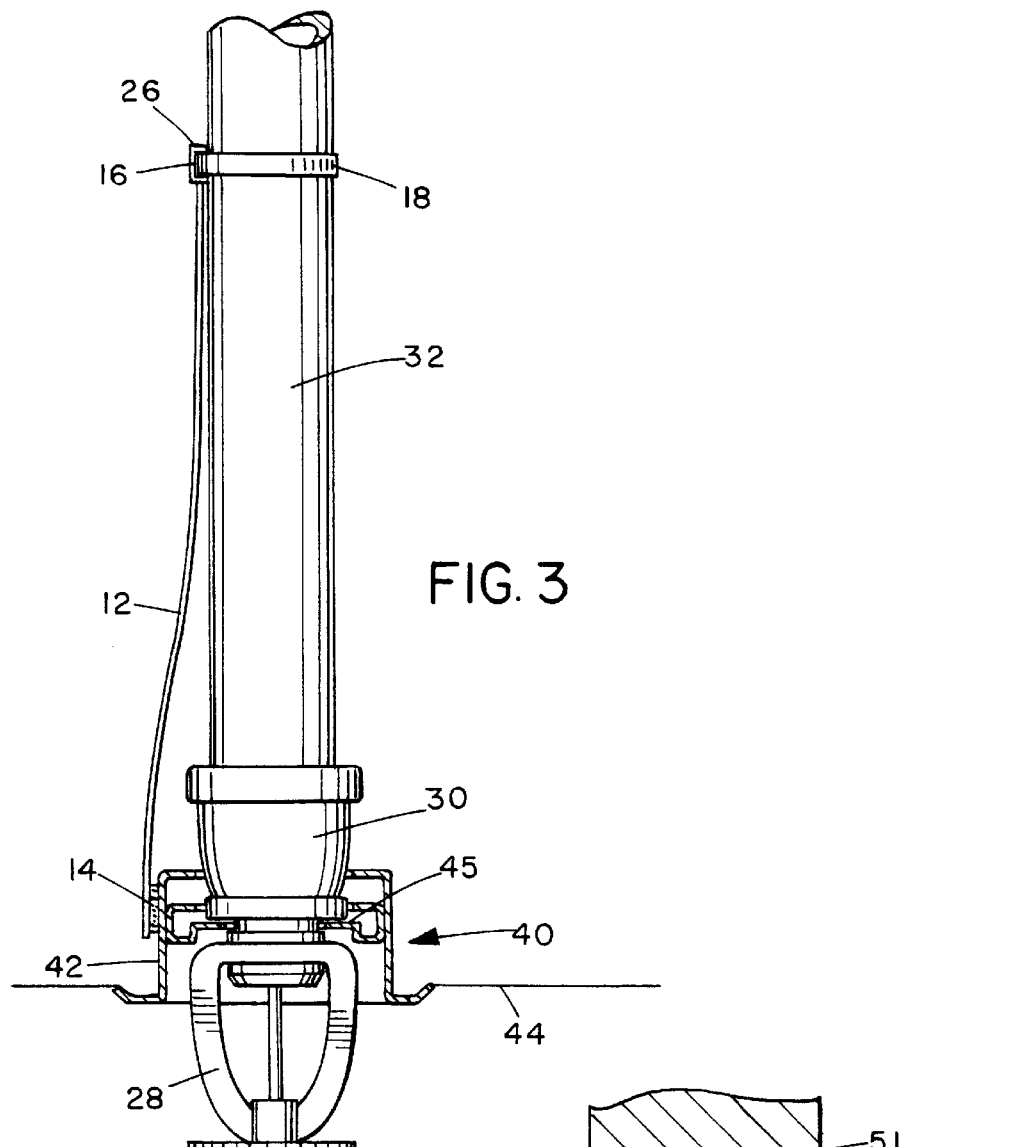
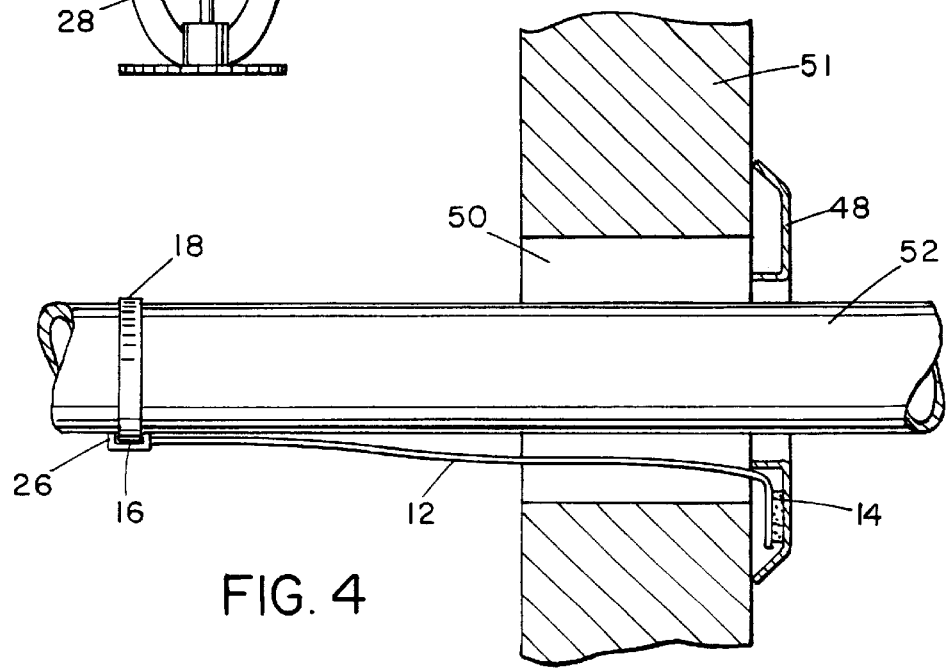

RETAINER ASSEMBLY FOR PIPING ESCUTCHEONS OR WALL PLATES

BACKGROUND OF THE INVENTION

The present invention relates generally to piping or plumbing systems where pipes or fire sprinklers exit into rooms in a house or building via openings in ceilings, floors or walls, and is particularly concerned with a retainer assembly for securing an escutcheon, wall plate, or decorative canopy mounted at the opening against loosening or falling off in the event of an earthquake or other seismic occurrence.

Decorative and protective wall plates, canopies or escutcheons mounted around openings in building walls, floors and ceilings may loosen and even fall off in the event of severe shaking or jolts to the building, as may occur in an earthquake, tornado, storm or the like. In the event that such parts do become loose and fall, extra damage to the building and potential injury to its occupants is possible. Up to now, there has been no effective way to secure such components so that they are more resistant to loosening if the building shakes or vibrates.

SUMMARY OF THE INVENTION

It is an object of the present invention to provide a new and improved retainer assembly for a building wall plate, canopy or escutcheon at a wall or ceiling opening.

According to one aspect of the present invention, a retainer assembly is provided for securing an escutcheon member surrounding an opening in a building wall, ceiling or floor to a pipe extending through the opening, the assembly comprising an elongate tether or strap having opposite first and second ends, the first end having a fastener for securing the tether to an escutcheon member, the second end having a slot, and a flexible tie extending through the slot in the second end for tying around a pipe at a location spaced inwardly from a wall, floor or ceiling opening.

In a preferred embodiment of the invention, the first end of the tether comprises a pad having an adhesive layer on one face for adhesively securing the first end to the escutcheon member, cover plate or canopy. The tether is preferably of flexible, strong material such as nylon or the like. The flexible tie is preferably a cable tie which has an adjustable fastener device for adjustably securing the tie in a loop around a body such as a pipe. Plumbing pipes are secured to the building structure and are therefore stable and resistant to shaking or vibration resulting from earthquakes and other building disturbances. By tying building wall plates, escutcheons, canopies and the like to such pipes, these structures can also be made more resistant to loosening in the event of such disturbances. Even if the plate, flange or canopy should become loose, it cannot fall off or down since it will still be tethered to the relatively solid pipe.

According to another aspect of the invention, a retention system for an escutcheon member such as a wall, ceiling or floor plate, flange or canopy surrounding a wall, ceiling or floor opening is provided, which comprises a pipe secured to a building structure and extending through an opening in a wall, floor or ceiling, an escutcheon member secured around the opening surrounding the pipe, and a tether having a first end secured to the escutcheon member and a second end secured to the pipe on the inner side of the opening.

Preferably, the first end of the tether is secured to the escutcheon member via an adhesive pad, and the second end of the tether has a slot through which a cable tie extends for securing around the pipe.

According to another aspect of the invention, a method of securing a plate, flange or canopy surrounding a wall, ceiling or floor opening to a building structure for additional retention comprises the steps of attaching one end of an elongate tether or strap to an escutcheon member such as a plate, flange or canopy, securing the escutcheon member to an outer surface of a wall, floor or ceiling surrounding an opening through which a pipe extends, extending the second end of the tether back through the opening to the inner side of the wall, ceiling or floor, and securing the second end of the tether to the pipe leaving some free play in the tether to allow for relative movement between the escutcheon member and the attachment position on the pipe.

With this invention, risk of injury due to wall, ceiling or floor plates or canopies becoming loose and falling off, and possibly flying around in a seismic event, is significantly reduced. Even if the screws or the like removably attaching such members to a ceiling, wall or floor should loosen, the members will still be tethered to the pipe, and cannot fall down or potentially injure someone. The retainer assembly is inexpensive and quick and easy to attach, and may be readily used throughout a building for added security against earthquakes or other events causing building movement.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 3 is a similar view, but with a recessed type canopy; and

FIG. 4 is a side view with the strap attached to a wall mounted escutcheon.

DESCRIPTION OF THE PREFERRED EMBODIMENT

Figure 1:
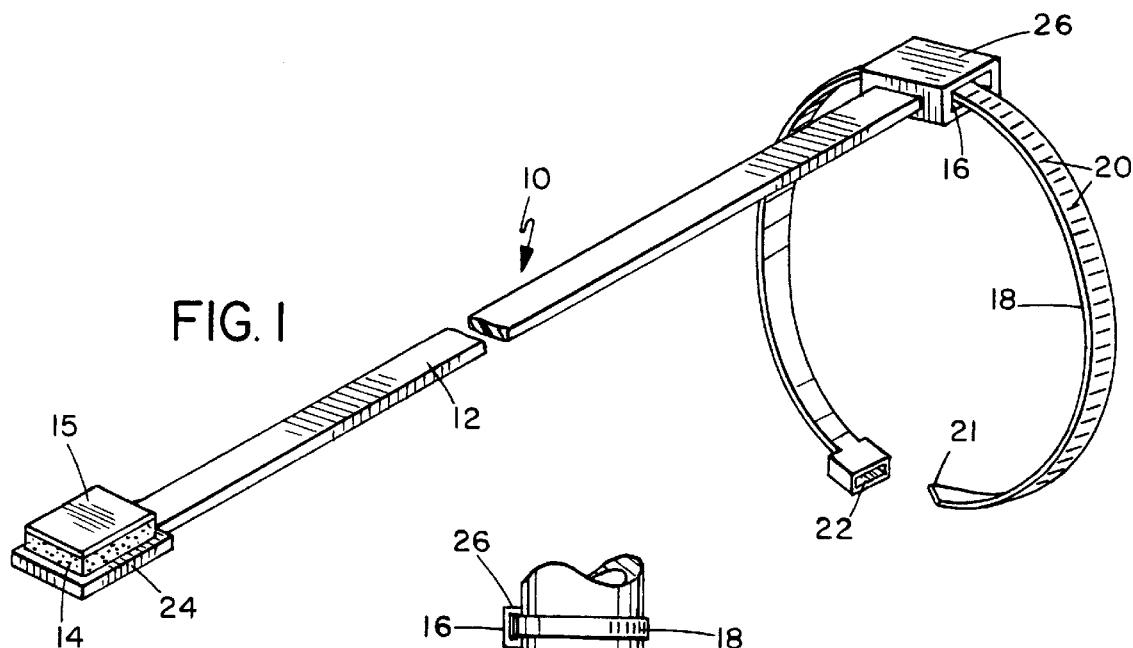
FIG. 1 illustrates the retainer strap assembly according to a preferred embodiment of the invention.
Figure 2:
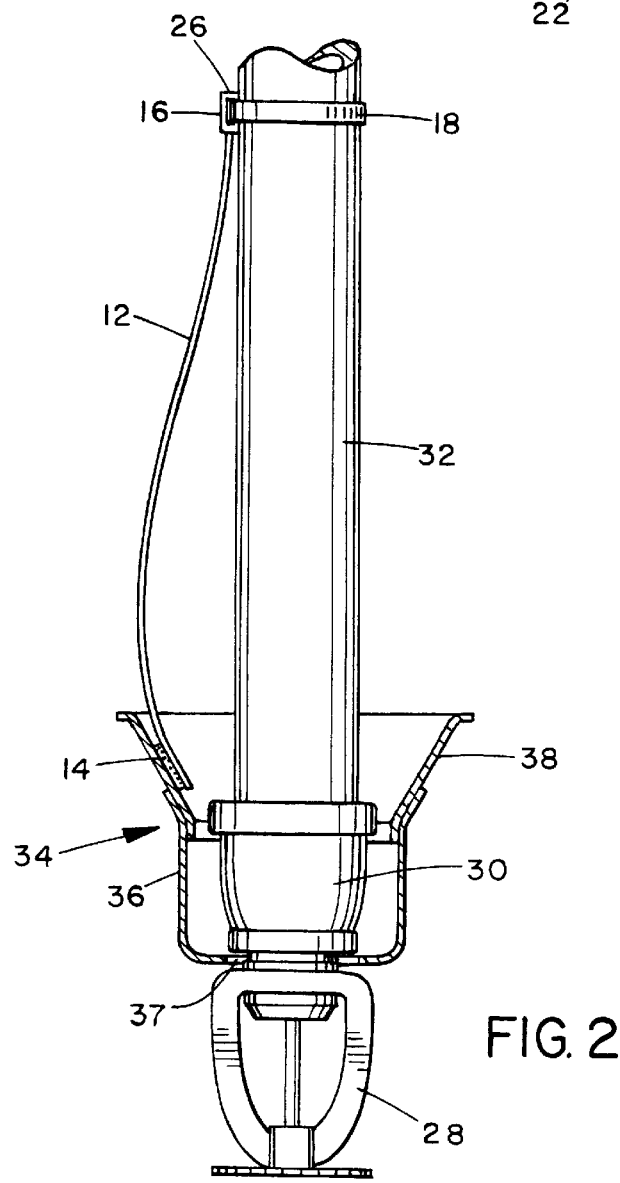
FIG. 2 is a side view, partially in section, showing the retaining strap installed on a sprinkler with a pendent canopy.

FIG. 1 illustrates a retainer assembly 10 according to a preferred embodiment of the invention, while FIGS. 2 to 4 illustrate some alternative uses of the assembly with various types of wall plates or escutcheons, as explained in more detail below. As best illustrated in FIG. 1, the retainer assembly 10 basically comprises an elongate tether or strap 12, which may be of nylon or other sufficiently strong material, having an adhesive pad 14 covered with a peel-off cover paper layer 15 at one end, and a transverse slot 16 at the opposite end through which a cable tie 18 or the like extends.

The cable tie 18 is also of nylon, plastic or other strong material and preferably comprises a conventional cable or zip-lock tie as available from numerous manufacturers. Cable tie 18 has a plurality of projecting teeth 20 on one face extending up to a first end 21, and a slot 22 at the second end through which the first end may be pulled to form a loop. The first end 21 can be pulled only in one direction through slot 22, and cannot be retracted due to teeth 20 engaging a suitable opposing tooth or shoulder within slot 22. Thus, the first end 21 is pulled through until the loop is at the desired tightness or diameter around an object to which the tie is to be secured.

The tether or strap 12 has opposing flat faces and includes an enlarged end portion 24 at the first end. Adhesive foam pad 14, which is of a suitable permanent, strong adhesive material, is placed on one flat face of end portion 24. The adhesive may be any adhesive suitable for permanent attachment to both plastic and metal. An enlarged rectangular block or head 26 of the same material as tether 12 is secured at the second end of the tether, and slot 16 extends through member 26 in a direction transverse to the longitudinal axis of tether 12. The width of the slot is slightly larger than the width of cable tie 18 so that the tie 18 can pass freely through the slot, as indicated in FIG. 1.

FIGS. 2 and 3 of the drawings illustrate the use of the retainer assembly in a typical fire sprinkler head installation. Such installations typically include a removable or movable canopy surrounding the ceiling opening for decorative and protective purposes. One such installation is provided, for example, by Central Sprinkler Corporation of Landsdale, Pa., although the retainer assembly may be conveniently used in any type of fire sprinkler head as well as other piping or plumbing installations.

FIG. 2 illustrates one possible arrangement for using the retainer assembly 10. Fire sprinkler heads, such as sprinkler head 28 of FIG. 2, typically extend through holes or openings in a ceiling and are secured by a reducing coupling 30 to a sprinkler pipe 32. In FIG. 2, a two-piece pendent canopy 34 is secured around the sprinkler pipe and coupling in a known manner at the ceiling opening, to improve the decorative appearance at the point where the sprinkler head extends into the room. Such canopies are well known in the field. The canopy is suitably removably or movably secured to the ceiling in a known manner, as will be understood by those skilled in the field. Canopy 34 comprises a cup 36 having an opening 37 through which the sprinkler head projects, and a tapered skirt or flange 38 secured inside the cup at one end and to the ceiling at the opposite end.

Prior to installation of canopy 34, the peel-off cover strip 15 of retainer assembly 10 is peeled away from adhesive pad 14, and the second end of the tether 12 is secured to the inner face of skirt 38 via the adhesive pad. Prior to attaching the tether, the area to which it is to be attached is cleaned to ensure that it is free of grease, oil or other contaminants which may prevent proper adhesion. The area to which the tether is attached is selected to ensure that the tether placement will not interfere with proper installation of the escutcheon or canopy. The escutcheon or removable canopy is then installed according to the manufacturer's instructions. A cable tie 18 of the proper length, dependent on the diameter of pipe 32, is then inserted through the slot 16 at the second end of the tether. The cable tie is extended around the pipe to which the canopy is installed, and the free end 21 is pulled through slot 22 and tightened so that the cable tie is fastened securely around the pipe. The tether is not pulled tight between the escutcheon attachment position and the cable tie placement on the piping, but is left loose with some free play between these positions, as illustrated in FIG. 2. There should be sufficient free play in the tether between these two positions to allow for minor adjustments of the movable or removable canopy or escutcheon.

The tether or retainer assembly will prevent the movable or removable canopy from falling away from its installed position in the event of an earthquake or other seismic occurrence, reducing the risk of injury or damage and providing added earthquake security. The arrangement provides retention against loosening and detachment of the canopy in the event of any building vibration, whatever the cause.

FIG. 3 illustrates an alternative installation for a fire sprinkler head having a different type of decorative canopy 40. In this embodiment, the sprinkler head and sprinkler pipe are identical to the previous embodiment, and like reference numerals have been used for like parts as appropriate. The canopy 40 is of a known recessed type, available from various manufacturers, and has a recessed canopy skirt 42 suitably installed in ceiling 44 and a canopy retainer 45 within the skirt for retaining sprinkler head 28 in a known manner. The adhesive pad 14 is preferably secured to the outside surface of canopy skirt 42, as indicated in FIG. 3. Cable tie 18 is then tightened around pipe 32 at the appropriate position so as to leave some free play in tether 12, as in the previous arrangement.

FIG. 4 illustrates another alternative arrangement in which the tether assembly is used to secure a wall, floor or ceiling plate or flange 48 of the type which is typically installed at a building hole or opening 50 in a wall, ceiling or floor 51 around a plumbing pipe 52 extending through opening 50. Such plates, flanges or escutcheons are decorative or protective members which are typically removably mounted about the opening via screws or the like. In this case, if the plate or flange has already been installed, it is first removed from the wall, ceiling or floor, and the inner face 54 is cleaned to ensure that any oil, grease, dirt or the like is removed from the surface. The protective film or cover layer 15 is then removed from the adhesive pad 14, and the pad is pressed against the inner surface of the plate or flange so as to secure the end of the tether in position. The other end of the tether is then extended back through opening 50, and the plate 48 is re-secured about the opening. A cable tie 18 of appropriate length is then inserted through the slot 16 in the opposite end of the tether, and secured around the pipe 52 at an appropriate position spaced inwardly from wall, ceiling or floor 51 so as to leave some free play in tether 12, as in the two previous arrangements.

In one example of the invention, the length of the tether was 8 inches and the width was around 0.19 inches. The cable tie length is variable, but a cable tie of 8 inches in length will be used for one inch pipe drops. The pad 14 was a ¼ inch by ⅜ inch double-sided adhesive foam pad. The block or head 26 had a width of 0.30 inches and a length of 0.35 inches, while slot 16 had a width of 0.21 inches. These dimensions have been found to provide a tether of sufficient strength for most applications.

FIGS. 2 to 4 illustrate three of many possible installations using the tether assembly 10. The assembly 10 is suitable for any other installation where retention of parts such as piping canopies, ornamental plates, flanges or escutcheons is needed to protect against such parts loosening and falling off in the event of building vibrations such as those experienced during seismic activity and the like. Although the first end of the tether is preferably secured to the movable or removable part by a permanent adhesive, other attachment methods may alternatively be used. Similarly, although a cable tie is the preferred device for attaching the second end of the tether to the pipe, other fasteners may alternatively be used, such as permanent adhesive or other ties or clamps for fastening around a pipe. However, the assembly of the preferred embodiment is strong, inexpensive and simple to use, and provides a secure fastener arrangement.

Although a preferred embodiment of the invention has been described above by way of example only, it will be understood by those skilled in the field that modifications may be made to the disclosed embodiment without departing from the scope of the present invention, which is defined by the appended claims.

I claim:

1. A retainer assembly for securing an escutcheon member surrounding an opening in a building wall, ceiling or floor to a pipe extending through the opening, comprising:

an elongate tether of flexible nylon material having opposite first and second ends;

a fastener secured to the first end of the tether for securing the tether to an escutcheon member;

the second end of the tether having a slot; and a flexible tie extending through the slot in the second end for tying around a pipe at a location spaced inwardly from a wall, floor or ceiling opening.

2. The assembly as claimed in claim 1, wherein the fastener comprises a pad of permanent adhesive material.

3. The assembly as claimed in claim 2, wherein the tether has opposite flat faces and the adhesive pad is secured to one flat face of the tether.

4. The assembly as claimed in claim 1, including an enlarged block secured to the second end of the tether, the block having a thickness greater than the thickness of the tether, and the slot extending through said block in a direction transverse to the longitudinal axis of the tether.

5. The assembly as claimed in claim 1, wherein said flexible tie comprises a cable tie member having first and second ends, the first end of said cable tie member having a slot and the second end of said cable tie member having a series of spaced teeth for selective locking engagement in the slot to form a loop of selected diameter around a pipe.

6. A combination of an escutcheon member and a retention system for the escutcheon member comprising:

a pipe secured to a building structure and extending through an opening in a wall, floor or ceiling;

an escutcheon member secured around the opening surrounding the pipe, the escutcheon member being secured to a first location on the pipe adjacent said opening;

an elongate flexible strap-like tether of predetermined length and width, the tether having a first end secured to the escutcheon member and a second end secured to the pipe at a second location spaced from the first location the length of the tether being greater than the width;

the second end of the tether having a slot; and a cable tie extending through the slot and tied around the pipe at said second location to secure the second end of the tether to the pipe.

7. The combination as claimed in claim 6, wherein the tether has a predetermined length and the distance between said first location and said second location is less than the length of the tether so as to leave some free play in the tether between its secured ends.

8. The combination as claimed in claim 6, wherein the first end of the tether has a pad of permanent adhesive securing the tether to said escutcheon member.

9. A method of securing a plate, flange or canopy surrounding a wall, ceiling or floor opening to a building structure, comprising the steps of:

attaching one end of an elongate, flexible, strap-like tether to an escutcheon member such as a plate, flange or canopy, the tether having a length substantially greater than its width;

securing the escutcheon member to an outer surface of a wall, floor or ceiling so that the escutcheon member surrounds an opening through which a pipe extends; and securing the second end of the tether to the pipe at a location spaced inside the opening and leaving some free play in the tether between the two secured ends to allow for relative movement between the escutcheon member and the attachment location on the pipe.

10. The method as claimed in claim 9, including the step of cleaning a surface portion of the escutcheon member to which the tether end is to be attached prior to attaching the tether end, the step of attaching the tether end comprising pressing an adhesive pad on the end of the tether against the cleaned surface portion of the escutcheon member.

11. The method as claimed in claim 9, wherein the step of securing the second end of the tether to the pipe comprises extending a cable tie through a slot in the second end of the tether and fastening the cable tie in a loop around the pipe at the selected location.

* * * * *